Sept. 11, 1962   J. E. BROWNING ETAL   3,053,352
INDICATING MECHANISM FOR CELL DOORS AND LOCKS
Filed July 7, 1961   7 Sheets-Sheet 3
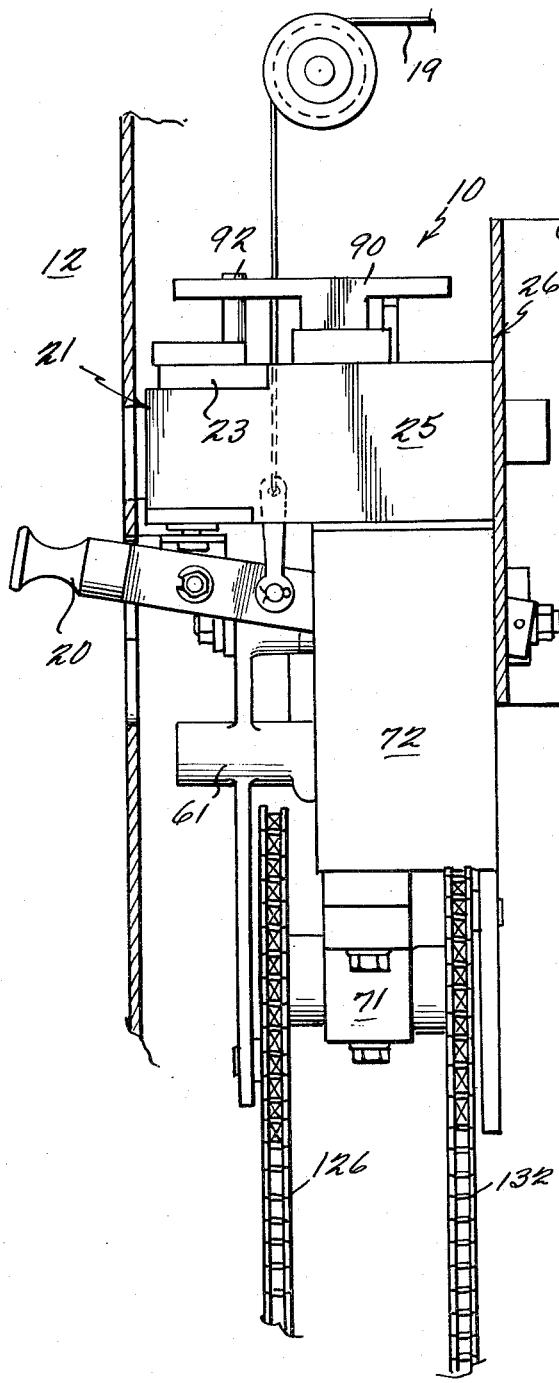
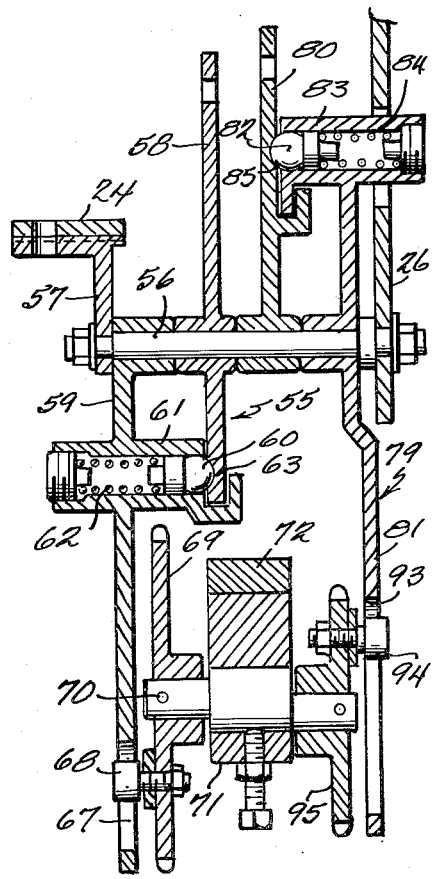
INVENTORS
JAMES E. BROWNING
ARCHIE L. ANDERSON
DAVID HULL YOUNGBLOOD
BY
Adams & Bush
ATTORNEYS

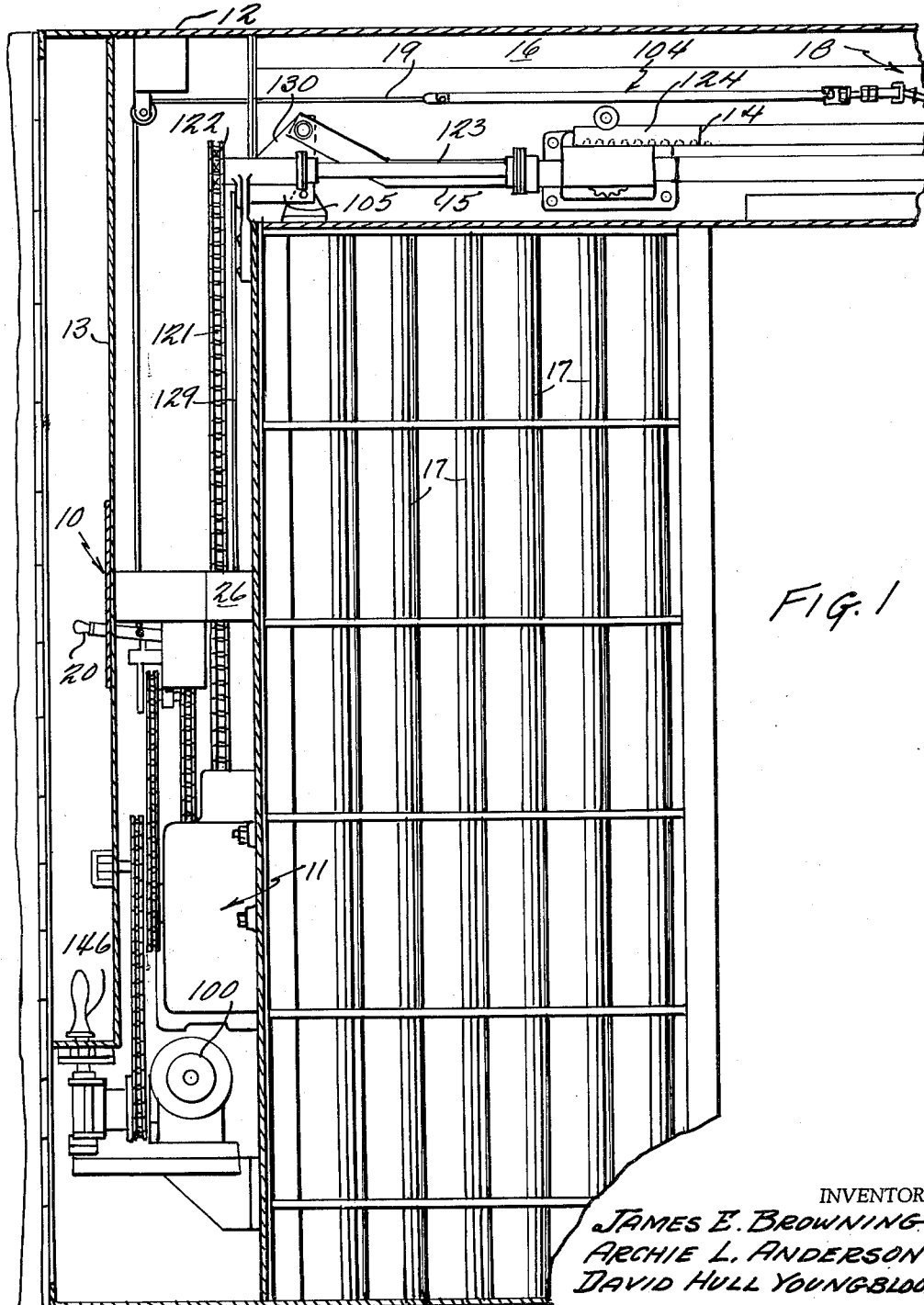

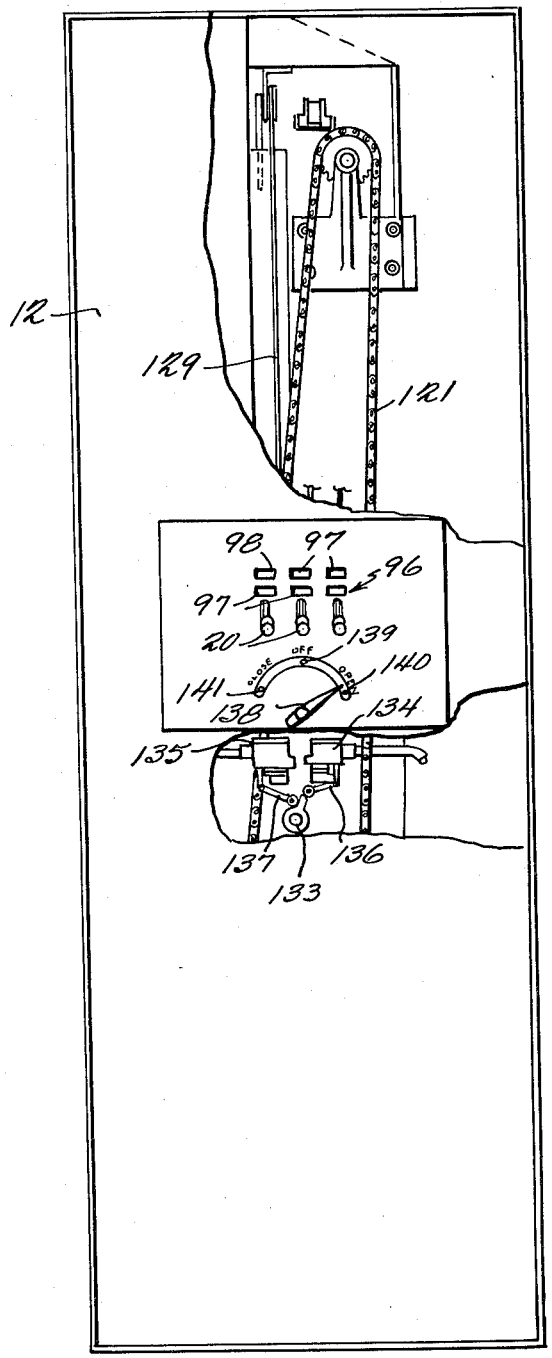

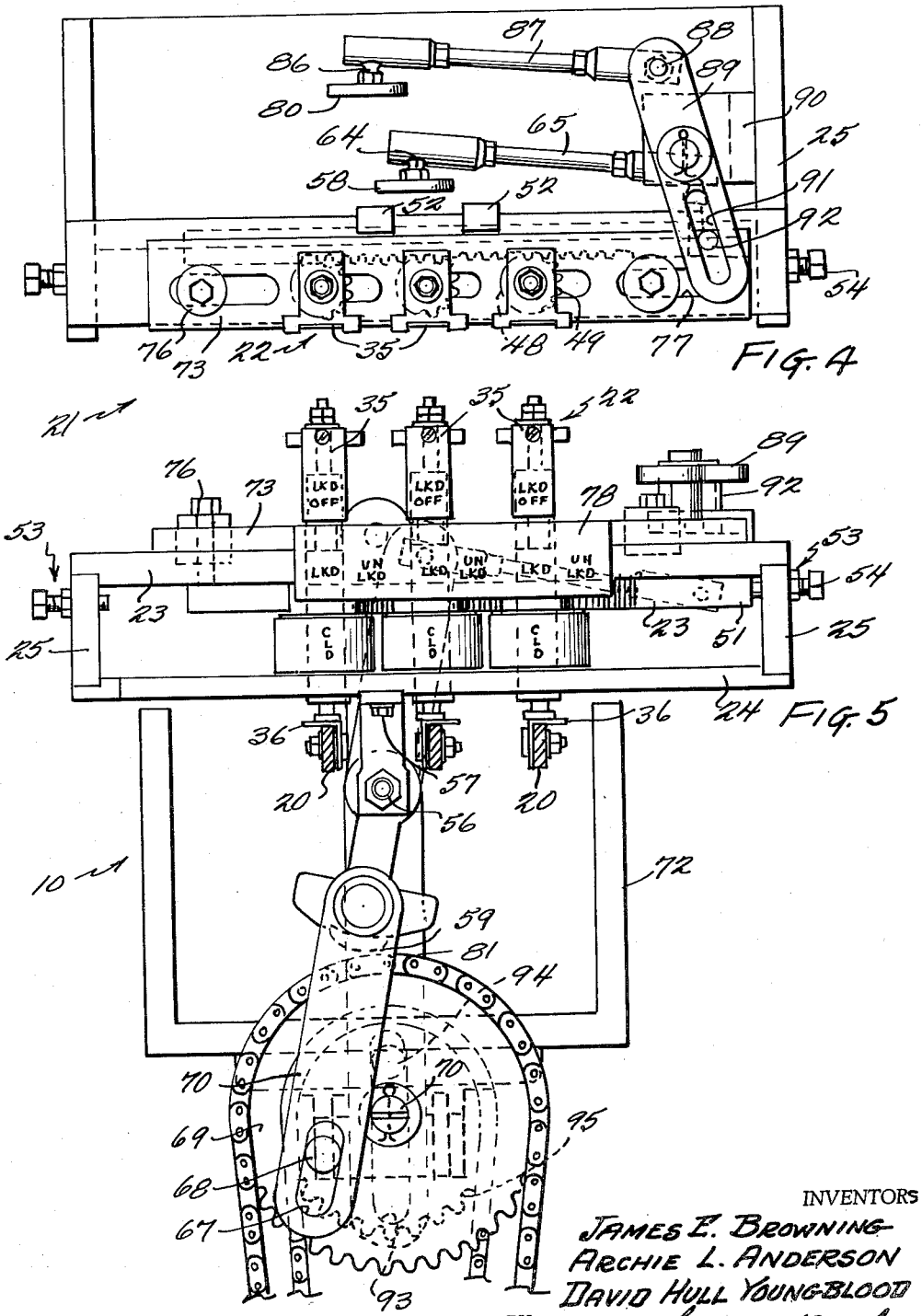

Sept. 11, 1962    J. E. BROWNING ETAL    3,053,352
INDICATING MECHANISM FOR CELL DOORS AND LOCKS
Filed July 7, 1961    7 Sheets-Sheet 5

INVENTORS
JAMES E. BROWNING
ARCHIE L. ANDERSON
DAVID HULL YOUNGBLOOD
BY Adams & Bush
ATTORNEYS Sept. 11, 1962 J. E. BROWNING ETAL 3,053,352
INDICATING MECHANISM FOR CELL DOORS AND LOCKS
Filed July 7, 1961 7 Sheets-Sheet 6
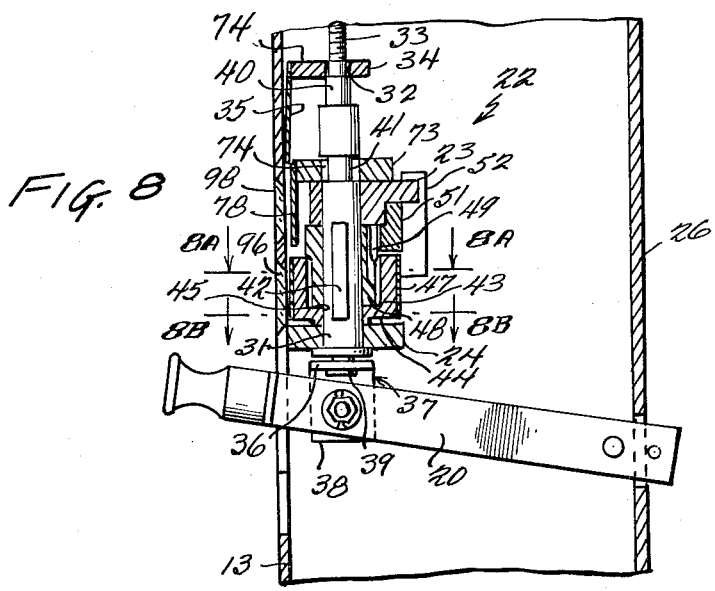
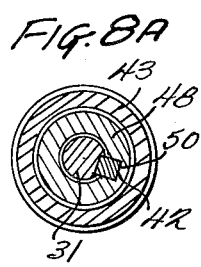
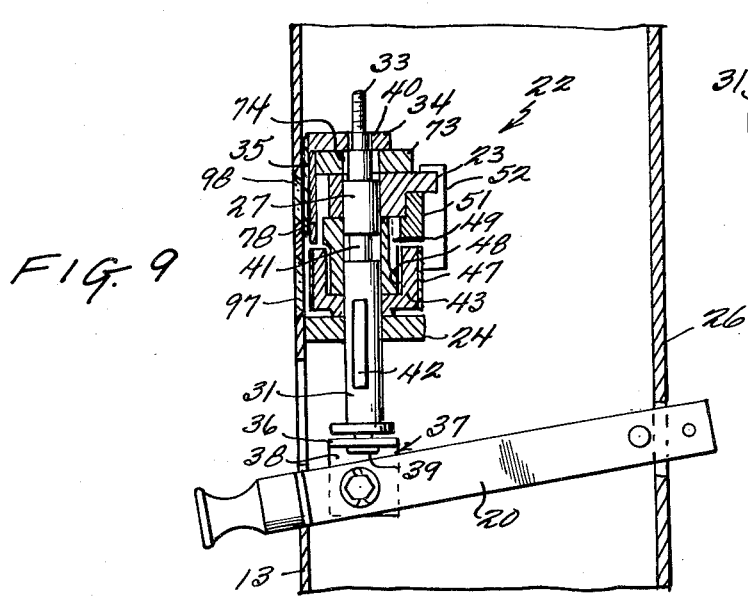
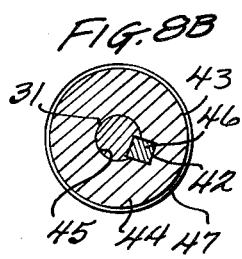
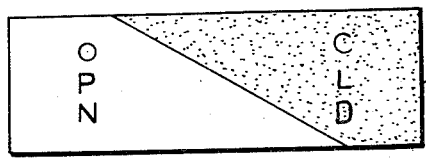
INVENTORS
JAMES E. BROWNING
ARCHIE L. ANDERSON
DAVID HULL YOUNGBLOOD
BY Adams & Bush
ATTORNEYS Sept. 11, 1962　　　J. E. BROWNING ETAL　　　3,053,352
INDICATING MECHANISM FOR CELL DOORS AND LOCKS
Filed July 7, 1961　　　　　　　　　　　　　7 Sheets-Sheet 7
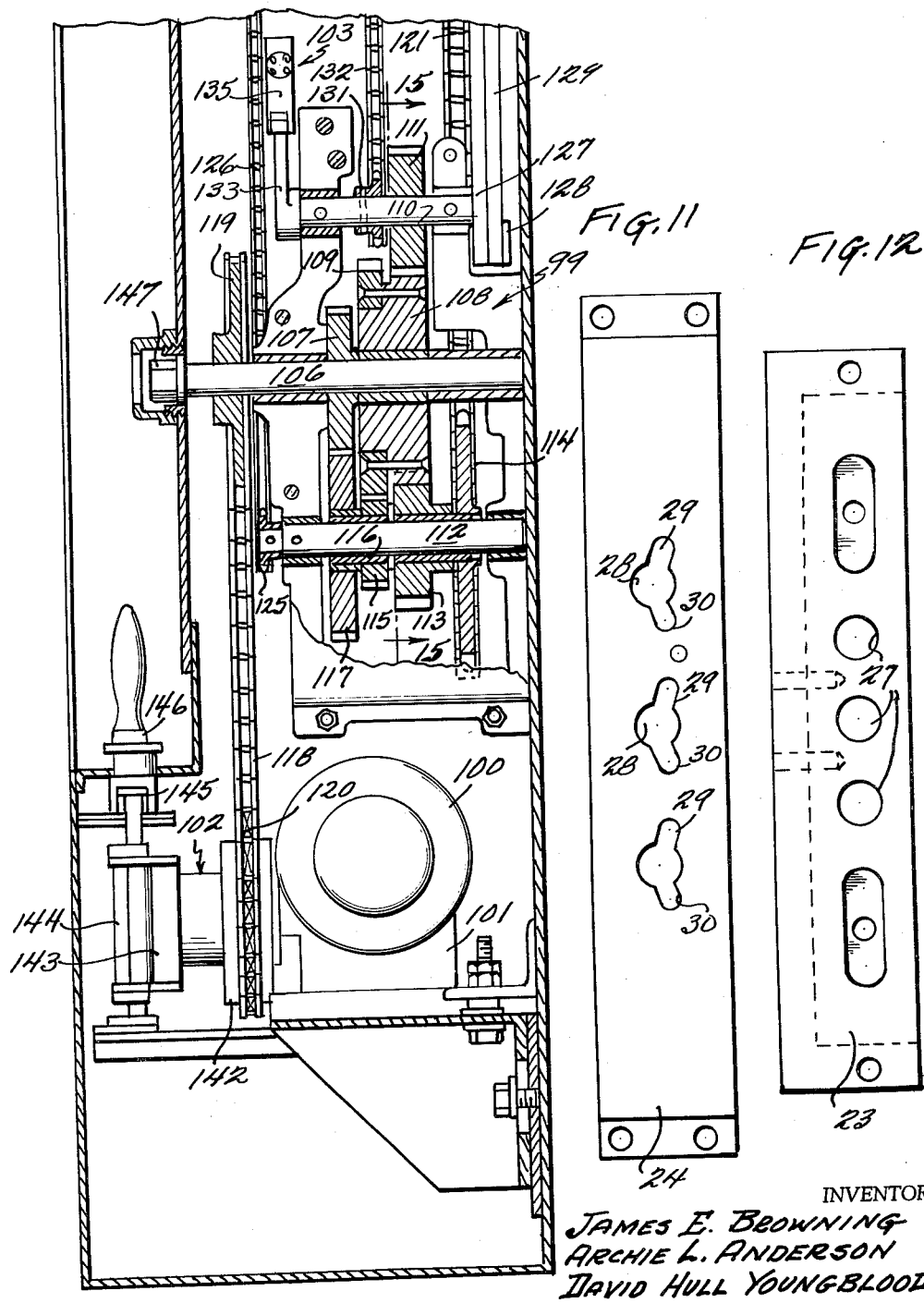
INVENTORS
JAMES E. BROWNING
ARCHIE L. ANDERSON
DAVID HULL YOUNGBLOOD
BY Adams & Bush
ATTORNEYS United States Patent Office 3,053,352
Patented Sept. 11, 1962

3,053,352
INDICATING MECHANISM FOR CELL
DOORS AND LOCKS
James E. Browning, Archie L. Anderson, and David Hull Youngblood, all of San Antonio, Tex., assignors to Southern Steel Company, San Antonio, Tex., a corporation of Texas
Filed July 7, 1961, Ser. No. 123,390
12 Claims. (Cl. 189—8)

This invention relates to keyless locking and operating systems for a plurality of sliding cell doors arranged in a row or series such as are used in jail and prison installations and has more particular reference to mechanically operated indicating mechanism for visually indicating at all times the open or closed position and the locked or unlocked condition of each sliding cell door.

One object of the present invention is to provide novel and improved mechanically operated indicating mechanism for use in jail and prison systems of the above type, to visually indicate at all times the open or closed position and the locked and unlocked condition of each sliding cell door.

Another object of the present invention is to provide mechanically operated indicating mechanism, as characterized above, which is operable whether the cell doors and locks are being operated by electrical or mechanical means.

Another object of the present invention is to provide mechanically operated indicating mechanism, as characterized above, which is adapted to be mounted in the single control cabinet which houses the controls for the electrical and manual operating means.

Another object of the present invention is to provide mechanically operated indicating mechanism, as characterized above, which is adapted to cooperate with door selective means so that the indicating mechanism will:

(1) Visually indicate which doors are locked closed while connected to master door operating and locking means.

(2) Visually indicate which doors are locked closed while disconnected from master door operating and locking means.

(3) Visually indicate which doors are locked open while connected to master door operating and lock means.

(4) Visually indicate which doors are locked open while disconnected from master door operating and locking means.

(5) Show which doors are in transit and visually indicate the position of the doors while in transit between the fully closed and open positions.

(6) Visually indicate which door or doors are unlocked before they are put in transit to either open or closed position.

(7) Provide means to protect against indexing out of sequence of operation.

(8) Prevent change in door selection after the door unlocking cycle of the door operation is started.

Other objects and advantages of the invention will appear in the following specification when considerd with the accompanying drawings, wherein:

FIG. 1 is a fragmentary side elevation showing one form of the visual indicating mechanism and how it is connected to be operated by the master actuating mechanism for operating master door propelling and lock bars which are connected to the intermittent gearing in the control cabinet;

FIG. 2 is a front elevational view, with parts broken away, of the control cabinet shown in FIG. 1;

FIG. 3 is an enlarged side elevational view of the visual indicating mechanism shown in FIG. 1, in the upper part of the control cabinet;

FIG. 4 is a plan view of the visual indicating mechanism showing the position of the mechanism when the cell doors are locked closed;

FIG. 5 is a front elevational view of the mechanism shown in FIG. 4;

FIG. 8 is a detailed view, partly in section, showing a door position indicator when the cell door associated therewith is selected "on";

Figure 6:
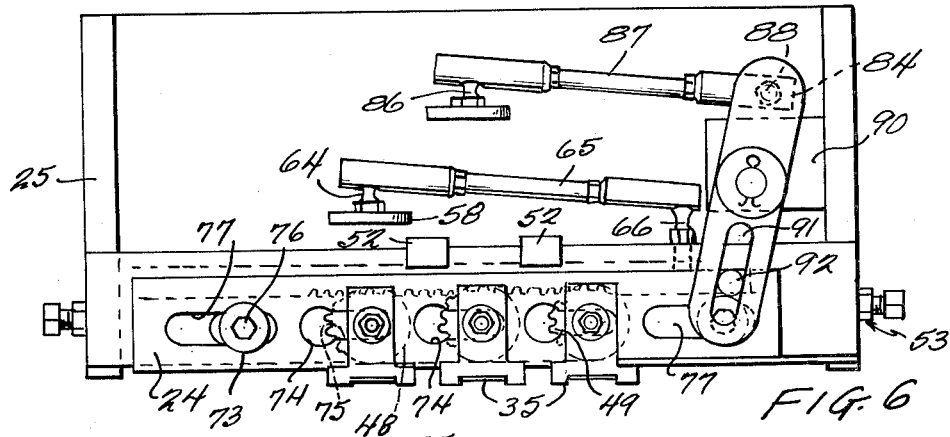
FIG. 6 is a view similar to that shown in FIG. 4, but showing the position of the mechanism when the cell doors are open and unlocked.
Figure 7:
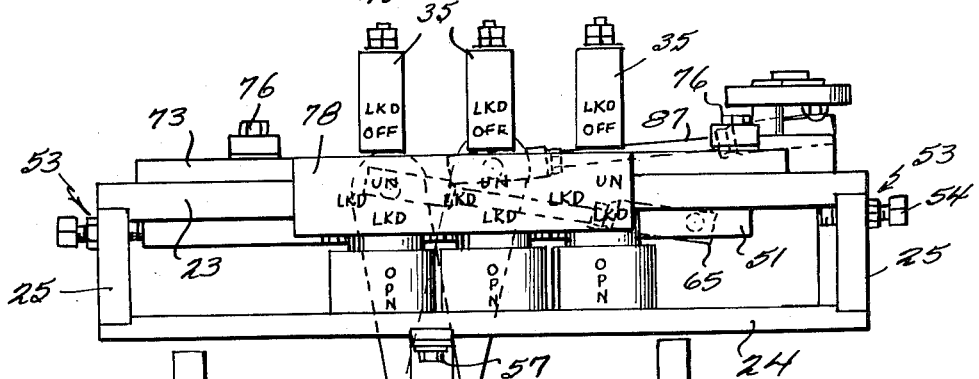
FIG. 7 is a front elevational view of the mechanism shown in FIG. 6.

FIGS. 8a and 8b are cross sectional views taken on the lines 8a—8a and 8b—8b, respectively, of FIG. 8;

FIG. 9 is a view similar to that shown in FIG. 8, but showing the door position indicator when the cell door associated therewith is selected "off";

FIG. 10 is an enlarged side elevational detail view in cross section of the actuating levers of the indicating mechanism;

FIG. 11 is a plan view of the lower frame bar;

FIG. 12 is a plan view of the upper frame bar;

FIG. 13 is a side elevational view of the door travel cycle strip;

FIG. 14 is an enlarged side elevational view, partly in cross section, of the master actuating mechanism in the lower portion of the control cabinet;

FIG. 15 is a detailed vertical sectional view taken on the line 15—15 of FIG. 14; and FIGS. 16 and 17 are views similar to that shown in FIG. 15, but showing the gearing in different positions.

The present invention provides novel and improved mechanically operated indicating mechanism to visually indicate, at all times, the open or closed position and the locked or unlocked condition of each sliding cell door in a jail cell installation of the type which employs master actuating mechanism for imparting sequential actuating movements to the selected locks and doors in a keyless locking and operating system for operating a plurality of cell doors in a fully selective manner and, in general, comprises a plurality of cylindrical door position indicating devices (one for each cell door of the installation), and means operated by the actuation of the door propelling bar for operating the cylindrical devices; a sliding locked or unlocked condition indicating bar to visually indicate the locked or unlocked condition of each cell door; and means operated by the actuation of the master door locking bar for operating the sliding locked or unlocked position bar.

While the apparatus of the present invention can be employed with any type of actuating mechanism for imparting sequential actuating movement to the selected locks and door in a keyless locking and operating system for operating a plurality of sliding cell doors in a fully selective manner, for the purposes of illustration, it will be illustrated and described as used in a system such as disclosed in the Loyd J. White et al. Patent No. 2,961,076.

Referring now to the drawings, there is illustrated, in FIGS. 1, 2, and 3, one embodiment of a mechanically operated indicating mechanism, constructed in accordance with the present invention, for visually indicating at all times the position and the locked or unlocked condition of each sliding cell door in a fully selective keyless locking and operating system such as disclosed in the patent to Youngblood, No. 1,785,471, and provided with a master actuating mechanism such as disclosed in the patent to Loyd J. White et al., No. 2,961,076, for sequential operation of the master propelling bar and the master locking bar.

As there illustrated, the mechanically operated indicating mechanism, indicated generally at 10, and the master actuating mechanism, indicated generally at 11, are shown as mounted at the end of a block of cells in a control cabinet 12, having an operating or control panel 13, and the control cabinet is usually located in a keeper's corridor (not shown).

The usual type of travel or door propelling bar 14 and locking operating bar 15 are shown as being mounted in the usual type of cover box 16 above the cell front wall 17. The wall 17 is shown as comprising a series of bars; however, in some types of installations such walls are made of steel plate or masonry.

Each of the cell doors in the series of cells is provided with a selector mechanism, indicated generally at 18, upper right FIG. 1, of the type shown in the aforesaid Youngblood Patent No. 1,785,471, for connecting and disconnecting the door and its locking mechanism to the master bars and each such mechanism is connected, as by means of a cable 19, to a selector lever or pin 20 pivotally mounted in the control cabinet 12. By operation of the selector levers or pins 20, whose ends project through the panel 13, any one of the cell doors and its locking mechanism may be connected to or disconnected from the master bars, making the system fully selective.

The mechanically operated indicating mechanism, indicated generally at 10, is shown as comprising a guide and supporting frame member, indicated generally at 21, see FIG. 3, in which are mounted a plurality of cell door position indicator devices, indicated generally at 22, see FIGS. 8 and 9, one for each of the sliding cell doors.

The guide and supporting frame member 21 is shown as comprising vertically spaced apart horizontally extending upper and lower guide and support bars 23 and 24, respectively, with the guide members having their outer ends secured to a spaced pair of supporting bars 25 having their inner ends fixedly secured to the index pin bracket 26 in the control cabinet 12.

The upper guide bar 23 is provided with a row of spaced circular openings 27 which form the upper bearings for the indicator devices 22, and the lower guide bar 24 is provided with a row of spaced circular openings 28 which form the lower bearings for the indicator devices 22. Each of the circular openings 28 has circumferentially spaced keyways 29, 30 opening thereinto for a purpose hereinafter to be described.

Each of the indicator devices 22 is identical in construction and, as shown in FIGS. 8 and 9, each comprises an inner rotatable cylindrical shaft 31 having its upper end slidably and rotatably journaled in one of the circular openings 27 in the upper guide member 23, and its lower end slidably and rotatably journaled in one of the circular openings 28 in the lower guide member 24.

The upper end portion of the shaft 31 projects through and above the upper guide member 23 and is cut away to provide a shoulder 32 and a threaded end portion 33. A member 34 carrying a depending yellow colored indicator member 35 having the notation

LKD
OFF printed thereon, is secured on the shoulder 32, as by a nut and washer.

The lower end portion of the shaft 31 projects through and below the lower guide member 24 and has a reduced end portion projecting through an opening formed in the horizontal leg 36 of an L-shaped connecting member 37, which member has its vertical leg 38 pivotally connected to one of the selector or indicator pins 20. The bottom end of the shaft 31 has an enlarged cylindrical head 39 formed thereon, insuring its connection to the L-shaped member 37.

The indicator pins 20, as shown in FIG. 1, are normally resiliently held in a position in which they extend upwardly toward the control panel 13. In this position the selector devices 18 connected to be operated by the indicator pins have been actuated to connect the cell doors associated therewith to the master propelling and locking bars; also, the shafts 31 of the indicator devices 22 are in a raised or "up" position, as shown in FIG. 8. Whenever the indicator pin 20 is operated (moved downwardly) to disconnect the cell door associated therewith from the master bars, the shaft 31 connected to the index pin is moved downward to a lowered or "down" position, as shown in FIG. 9, and the yellow colored indicator member 35 mounted on the upper end of the shaft 31 will be lowered to indicate that the cell door associated therewith has been locked off.

The shaft 31 has two vertically spaced circumferential recesses or grooves 40, 41 formed thereon intermediate its ends and the lower portion of the shaft below the lower groove 41 has an elongated key 42 fixedly secured thereon for a purpose hereinafter to be described.

A hollow cylindrical drum member 43 having an open upper end and having its bottom end closed by a wall 44 provided with a circular opening 45 and a keyway 46 opening into the circular opening, is mounted on the lower end portion of the shaft 31 with the key 42 slidably received in the keyway 46 (see FIG. 8b).

A two-colored plastic cylindrical indicia drum 47 is fixedly secured to the outer surface of the cylindrical member 43. The drum 47 has the vertical letters

O
P
N and the vertical letters

C
L
D circumferentially spaced thereon and with the space between the two groups of letters divided by a diagonal line into a triangular shaped green colored upper section having its apex over the letter group

O
P
N and a triangular shaped red colored lower section having its apex under the letter group

C
L
D (see FIG. 13).

An open ended hollow cylindrical gear member 48 having gear teeth 49 formed in the outer upper half thereof and having a longitudinally extending keyway 50, is mounted on the shaft 31 and nested within the open upper end of the hollow cylindrical member 43 with the key 42 on the shaft 31 adapted to be received in the keyway 50 (see FIG. 8a).

An elongated rack member 51 is slidably mounted under upper frame member 23 and supported by channel-shaped support members 52 carried by upper frame member 23 for horizontal reciprocation and is so positioned that the teeth of the rack engage the teeth of each of the gear members 48 of the indicators 22.

The rack 51 may be provided with adjustable stop member assemblies, indicated generally at 53, at each end, for limiting its linear movements. The stop member assemblies are identical in construction and, as shown in FIG. 5, each comprises an adjustable screw 54 threadedly adjustably mounted in and projecting through one of the side frame members 25 with its free end positioned to engage the rack.

Suitable actuating means are provided for moving the rack 51 in one direction when the master door propelling bar is moved to open the cell doors and in the opposite direction when the master door propelling bar is moved to close the cell doors. In the particular embodiment of the invention illustrated, such actuating means are shown as comprising a lever assembly, indicated generally at 55, pivotally mounted intermediate its ends on a fixed pin 56 having one end secured to the index pin bracket 26 in the control cabinet and its other end secured to a lug 57 depending from the bottom of the lower guide member 24 (see FIG. 10).

As a safety feature, the lever assembly 55 is made up of an upper lever section 58 pivotally mounted intermediate its ends on the fixed pin 56, and a lower lever section 59 having its upper end pivotally mounted on the fixed pin 56. The lower end of the upper lever section 58 is resiliently connected to the upper end portion of the lower lever section 59, as by means of a metal ball 60 mounted in a cylindrical member 61 formed in the upper end portion of the lower lever 59. A spring 62 adjustably mounted in the cylindrical member 61 behind the ball 60, forces the outer end portion of the ball into a recess 63 formed in the adjacent surface of the upper lever section 58, all as shown in FIG. 10. The construction and arrangement is such that when the rack 51 has reached the end of its movement in either direction, continued pressure applied to the lower lever section 59 will merely cause the two lever sections to be separated without resultant damage to the rack or the lever assembly. The upper lever section 58 is connected by a universal joint connector 64 to one end of an adjustable connecting rod 65 which has its other end connected to a universal joint connector 66 projecting laterally from the back side of the rack 51 (see FIGS. 5 and 6). The lower end of the lower lever section 59 is also provided with a slot 67 in which is received a cam follower pin 68 laterally projecting from a sprocket 69 rotatably mounted on a fixed shaft 70 which, in turn, is mounted in a bracket 71 fixedly connected to a housing structure 72 carried by the index pin bracket 26. The sprocket 69 is connected to be chain driven by the master actuating mechanism 11, in a manner hereinafter to be described.

In order to show the locked or unlocked condition of each of the cell doors, a horizontally reciprocable lock condition indicator bar 73 is slidably mounted on the upper surface of the upper guide frame bar 23. The bar 73 is an elongated flat bar and is provided with a plurality of laterally spaced circular holes 74 through each of which the shaft 31 of one of the door position indicator devices 22 extends. Each of the circular holes 74 has an elongated slot 75 opening thereinto. A pair of guide and stop members 76 fixedly connected to the upper guide bar 23 project upwardly and are received in slots 77 which are formed in the outer ends of the bar 73. These guide and stop members limit as well as guide the bar 73 in its linear reciprocatory movements.

The slots 75 in the bar 23 are of a width slightly larger than the diameter of the shaft 31 at the recesses or grooves 40, 41 formed therein.

The upper and lower recesses or grooves 40, 41 respectively formed in the shafts 31 of the indicator devices 22, are so spaced and are of such depth and width that when the shafts 31 of the indicator devices are in their "up" position, the lower recess portions 41 of the shafts are in position to enter the slots 75 (see FIG. 8) and when the shafts 31 are in their "down" position the upper recess portions 40 of the shafts are in position to enter the slots 75, thereby permitting reciprocatory movement of the bar 73 whenever the shafts 31 are in "up" or "down" position.

The forward edge of the bar 73 has an elongated depending indicia carrying bar 78 secured thereto. The bar 78 has a plurality of laterally spaced groups of indicia formed thereon, one for each cell door. Each group of indicia comprises the word UNLKD on a red background and the word LKD on a green background. The groups are so positioned that when the movement of the bar 73 in one direction has been terminated the word LKD will be over the indicators 22 and when the movement of the bar 73 in the other direction has been terminated the word UNLKD will be over the indicators 22.

Suitable means are provided for moving the bar 73 in one direction when the master locking bar is moved to unlock the cell doors and in the opposite direction when the master locking bar is moved to lock the cell doors. In the particular embodiment of the invention illustrated, such means are shown as comprising a lever assembly, indicated generally at 79, pivotally mounted intermediate its ends on the fixed pin 56 between the lever assembly 55 and the index pin bracket 26 of the control cabinet (see FIG. 10). Also, as a safety measure, the lever assembly 79 is made up of an upper lever section 80 having its lower end pivotally mounted on the fixed pin 56 and a lower lever section 81 pivotally mounted intermediate its ends on the fixed pin 56. The upper end of the lower lever section 81 is resiliently separably connected to the upper lever section 80, as by means of a metal ball 82 mounted in a cylindrical member 83 formed on the upper end of the lower lever 81. A coil spring 84, housed in the cylindrical member 83 outwardly of the ball 82, forces the inner end portion of the ball into a recess 85 formed in the adjacent surface of the upper lever section 80. The construction and arrangement is such that when the bar 73 has reached the end of its movement in either direction, continued pressure applied to the lower lever section 81 will merely cause the two lever sections to be separated without resultant damage to the lever assembly.

The upper end of the upper lever section 80 is connected by a universal joint connector member 86 to one end of an adjustable rod 87, the other end of which is pivotally connected by a universal joint connector member 88 to one end of a lever 89, which is pivotally mounted intermediate its ends on a bracket 90 secured to a side frame member 25 (see FIGS. 4 and 6). The other end of the lever 89 has an elongated slot 91 formed therein in which is slidably received a pin 92 projecting upwardly from the upper surface of the bar 73. The lower end of the lower lever section 81 also is provided with a slot 93 in which is received a cam follower pin 94 projecting laterally from a sprocket 95 mounted on the fixed shaft 70 (see FIG. 10). The sprocket 95 is connected to be chain driven by the master actuating mechanism.

The control panel 13 has a plurality of laterally spaced pairs 96 of vertically spaced sight openings 97 formed therein, one pair for each of the indicators 22. Each of the sight openings 97 is provided with a transparent window 98 and is of sufficient height and width that the door position indicator 22 and the locked position indicator for each cell door are clearly visible through the sight openings associated therewith. Also, when one of the cell doors is indicated "locked off" the yellow indicator member 35 mounted on the upper end of the shaft 31 of the door position indicator 22 will be lowered to cover the locked position indicator bar 75 and show the cell door is "locked off"; whether in the "open" or "closed" position, will be indicated by the door position indicator 22.

The foregoing construction and arrangement is such that when all the cell doors are connected to be operated by the master door propelling bar and the master locking bar, and all the cell doors are in a locked closed position, the locked condition indicator bar 73 will have been moved to the right, as viewed in FIG. 4, to bring the indicia LKD into the sight windows 97 formed in the control panel. The shafts 31 of the door position indicators 22 will be in their raised or "up" position, in which position the lower grooves 41 on the shafts will be in position to enter the slots 75 formed in the member 73. The keys 42 on shafts 31 will be raised up out of engagement with the keyways 30 in the lower guide bar 24, but in engagement with the keyways 46 and 50 of the indicia carrying cylindrical members 43 and the cylindrical gear members 48, thereby locking these members together for rotation about a vertical axis by the reciprocating movement of the rack bar 51. The rack bar 51 will have terminated its movement to the right, as viewed in FIG. 4, due to the termination of the movement of the master door propelling bar to effect the closing of the cell doors.

When the master locking bar 15 has been moved to unlock the cell doors the locked condition indicator bar 73 will have been moved to the left, as viewed in FIG. 6, bringing the indicia UNLKD into the sight openings 97. The shafts 31 of the door position indicators 22 will remain in their "up" position so that the lower grooves 41 on the shaft enter the slots 75 formed in the bar 73. When the master door propelling bar 14 has been moved to move the cell doors to open position, the rack 51 will have terminated its movement to the left, as viewed in FIG. 6, and the indicia drums 47 of the door position indicators 22 will have been rotated to bring the indicia

O
P
N into the sight openings 97. Also the keys 42 on the shaft 31 will have been brought into vertical alignment with the keyways 29 formed in the lower guide bar 24.

In addition to the foregoing, the construction of the slots 75 in the slide bar 73 and the upper and lower grooves 40, 41, respectively, in the shafts 31 of the indicator devices 22 provide means to protect against indexing out of sequence of operation and prevent change in door selection after the door unlocking cycle of the door operation is started. When the shaft 31 is in up position or door "on" position and slots 75 in slide bar 73 have engaged the lower circumferential groove 41 on the shaft 31, and before rack 51 has started to move, shaft 31 cannot be pulled down to door "off" position because the upper edge of the circumferential groove 41 on shaft 31 will come in contact with the upper side of slide bar 73. In like manner, when the shaft 31 is in down position or door "off" position and slide bar 73 has moved to unlocked position, the slot 75 in bar 73 has engaged the upper circumferential groove 40 in shaft 31 and before the rack 51 has started to move the shaft 31, cannot be moved to door "on" position because the lower edge of the circumferential groove 40 on the shaft 31 will come in contact with the under side of the slide bar 73.

The master actuating mechanism, indicated generally at 11, is generally similar to that shown in the aforesaid Patent No. 2,961,076, to White et al., and is shown as comprising an intermittent gearing, indicated generally at 99; a reversible electric motor 100 connected to drive the gearing 99 through a reduction gear 101; clutch mechanism indicated generally at 102, for connecting and disconnecting the reduction gear from the intermittent gearing 99; a limit switch mechanism, indicated generally at 103, for stopping the motor 100 when the selected doors have reached a locked open position or a locked closed position; a pinion and rack drive gear assembly, indicated generally at 104, connected to be driven by the intermittent gearing and connected to give longitudinal movement to the master propelling bar 14; and a bell crank assembly, indicated generally at 105, connected to be operated by the intermittent gearing and connected to give longitudinal movement to the master lock operating bar 15.

The intermittent gearing is mounted in a (split) gear case which is open at the top and closed at the bottom. The gear case is shown as bolted or otherwise secured to the back wall of the control cabinet 12.

The intermittent gearing is generally similar to that shown in the aforesaid Patent No. 2,961,076, to White et al., and is shown as comprising a main or drive shaft 106, journaled in and extending through the gear casing and having a driving gear 107 keyed thereon; a large intermittent gear 108 rotatably mounted thereon and having a ring gear 109 secured thereto; an upper rotatable shaft 110 having an intermittent pinion 111 keyed thereon and positioned to engage the intermittent gear 108 on the drive shaft 106; a lower rotatable shaft 112 journaled in and extending through the gear casing and having an intermittent pinion 113 keyed thereon in position to engage the intermittent gear 108 on the drive shaft 106; a sprocket 114 having its hub keyed on the shaft 112; and a small driving pinion 115 rotatably mounted on the shaft 112 in position to engage the ring gear 109 secured on the large intermittent gear 108 and having a hub 116 on which is keyed a pinion 117 in position to engage the driving gear 107 on the shaft 106. The arrangement is such that the intermittent pinion 113 is connected to impart movement to the door propelling bar 14 and operate the door position indicators 22 of the indicating mechanism 10; and the intermittent pinion 111 is connected to impart movement to the locking bar 15, operate the limit switch mechanism 103, and the locked or unlocked condition indicator carrying member 73 of the indicating mechanism 10. The main shaft 106 of the intermittent gear 108 is connected to be driven by the reversible motor 100, as by means of a sprocket chain 118 passing over a sprocket 119 keyed on the shaft 106 and a sprocket 120 mounted on a hub forming part of the clutch assembly and adapted to be driven by the drive shaft of the reduction gearing 101. The sprocket 120 is adapted to be disconnected from the drive shaft of the reduction gearing by the clutch assembly.

The manner in which the intermittent pinion 113 is connected to impart longitudinal movement to the master door propelling bar 14 is best seen in FIGS. 1 and 14. As there shown, the sprocket 114, keyed to the rotatable shaft 112 driven by the intermittent pinion 113, is connected by a sprocket chain 121 to drive a sprocket 122 keyed on the drive shaft 123 of the pinion and rack drive gear assembly 104. The inner end portion of the master door propelling bar 14 has a rack 124 secured thereto and engages the gearing in the pinion rack gear drive assembly so that, as the drive shaft 123 of the pinion rack gear drive assembly is rotated, the bar 14 will be moved longitudinally. The rack 124 is of sufficient length to provide the desired travel distance for the doors, and the size of the sprocket 114 determines the amount of movement that can be imparted to the travel bar and will be selected to suit any particular installation, depending upon the extent of opening movement of the doors.

The rack drive gear assembly 104 may be of any suitable type and, as illustrated, is similar to the rack drive assembly shown in the aforesaid White et al. Patent No. 2,961,076.

The manner in which the intermittent pinion 113 is connected to operate the door position indicators 22 is best seen in FIGS. 1 and 14. As there shown, the end of the rotatable shaft 112, which projects through the gear casing, has a sprocket 125 keyed thereon and connected by a sprocket chain 126 to the sprocket 69. The construction and arrangement is such that as the rotatable shaft 112 is rotated to move the cell doors from closed to open position or from open to closed position, the rack bar 51 will be moved to cause the door position indicators to indicate the corresponding opened or closed position of the doors, the direction of their movement, and the degree of movement in that particular direction.

The manner in which the intermittent pinion 111 is connected to impart longitudinal movement to the master lock bar 15 to operate the locked condition indicator 73 and operate the limit switch mechanism 103, is best shown in FIGS. 1 and 14. As there shown, the rotatable shaft 110, on which the intermittent pinion 111 is keyed, carries a crank arm or eccentric disc 127 on one end, on which is mounted a crank pin 128, and a link 129 connects the crank pin to the bell crank 130 of the bell crank rocker assembly 105, which, in turn, is connected to the locking bar 15.

The bell crank rocker assembly 105 is shown as comprising a bell crank 130 pivotally mounted on a bracket with one of its ends pivotally connected to the upturned end of the locking bar 15 and the other of its ends pivotally connected to the link 129 as above described.

The manner in which the intermittent pinion 111 is connected to operate the locked condition indicator bar 73 is best seen in FIGS. 1 and 14. As there shown, the rotatable shaft 110, on which the intermittent pinion 111 is keyed, has a sprocket 131 keyed thereon and which is connected to drive sprocket 95 of the indicating mechanism 10 by a chain 132.

The rotatable shaft 110 has a cam member 133 fixedly secured on its end opposite the crank arm 127 and extends laterally from the shaft at an angle of 180° from the direction in which the crank arm 127 extends laterally from the shaft. The cam is positioned to engage and operate the limit switch mechanism 103, as best seen in FIGS. 1 and 14. The limit switch mechanism comprises two limit switches 134, 135. The limit switch 134 is mounted in the circuit to the reversible motor, which, when energized, causes the motor to rotate in one direction, i.e., the direction which moves the cell doors from closed to open position, while the limit switch 135 is mounted in the circuit to the reversible motor, which, when energized, causes the motor to rotate in the opposite direction, i.e., the direction which moves the cell doors from opened position to closed position.

The limit switches 134, 135 may be of any suitable usual type. As shown, each is identical in construction and each is normally resiliently held in position to close the circuit to the motor in which it is mounted. The switch 134 is provided with a pivoted actuator 136 positioned to be engaged by the cam member 133 and moved to open the switch when the cell doors have been moved to open position and locked in this position. The switch 135 is provided with a pivoted actuator 137 positioned to be engaged by the cam member 133 and moved to open the switch when the cell doors have been moved to closed position and locked in this position.

A master switch 138 for controlling the operation of the reversible electric motor is mounted on the control panel 13 and, as shown, is movable from a central contact point 139 (marked OFF) in which both circuits to the motor are open, to a contact point 140 (marked OPEN) closing the circuit to energize the motor 100 to rotate in a direction to move the cell doors from closed to open position, and to a contact point 141 (marked CLOSED) closing the circuit to energize the motor 100 to rotate in a direction to move the cell doors from open to closed position.

The clutch mechanism, indicated generally at 102, may be of any suitable usual construction. As shown, it is identical to the clutch mechanism in the White et al. Patent No. 2,961,076, and such mechanism comprises a plate clutch unit 142, movable into and out of clutching engagement with the sprocket 120, rotatably mounted on the reduction gear drive shaft, and clutch throwout mechanism including a throwout yoke 143 pivotally connected to a clutch disengaging eccentric 144. The upper end of the eccentric 144 has a hexagonal nut secured thereon and adapted to be engaged by a socket member 145 carried by a crank 146. Thus, by moving the crank through 180° the eccentric is moved to engage and disengage the clutch mechanism. The crank is also employed to rotate the drive shaft 106 of the intermittent gearing 99, the socket member 145 fitting over a hexagonal nut 147 on the end of the drive shaft 106, which projects through an opening in the control panel 13.

The intermittent pinions 111 and 113 are meshed with the large intermittent gear 108 in such a manner as to provide the following sequential operations in one continuous run of the electric motor when the motor is run in the direction to cause the doors to be moved from locked closed position to locked open position:

(1) Unlock the series of doors (one or more as determined by the selective mechanism), and simultaneously move the lock indicating bar to show all the selected doors to be unlocked. (Note: the doors not selected to be unlocked will be shown by the indicator mechanism's yellow tag labeled "LOCKED OFF" to be locked.)

(2) Open all the said doors and simultaneously rotate all the door position indicators to show the doors opening and the amount of door movement between their fully closed and fully opened positions.

(3) Lock said doors in open position and simultaneously move the lock indicating bar to show all the selected doors to be locked.

(4) Automatically open the power circuit as the doors are locked to stop the motor.

In one continuous run of the motor operating in the reverse direction to cause the doors to be moved from locked open position to locked closed position:

(5) Unlock the selected doors and simultaneously move the lock indicating bar to show all the selected doors to be unlocked. (Note: the doors not selected will be shown by the indicator mechanism's yellow tag labeled "LOCKED OFF" to be locked.)

(6) Close said doors and simultaneously rotate all the door position indicators to show the doors opening and the amount of door movement between their fully closed and fully open positions.

(7) Lock said doors in closed position and simultaneously move the lock indicating bar 73 to show all the selected doors to be locked.

(8) Automatically open the power circuit as the doors are locked to stop the motor.

When the master actuating mechanism of the invention is in the position shown in FIGS. 1, 2, 14 and 15, the doors (which are moved from right to left to close, as viewed in FIG. 1) are in locked position, the motor is stopped, having been stopped by the cam member 133 engaging the actuator 136 of the limit switch 134 to open the circuit to the motor, which energizes the motor to rotate in the direction to move the doors to open position. After the doors have been moved to full open position and locked in this position, the crank pin 128 is at its lower dead center, having moved the locking bar 14 to the left as viewed in FIG. 1, by means of the bell crank 130, the sprocket 131 on the shaft 110 has driven the sprocket 95 of the indicating mechanism to cause the lever assembly 79 to move the lock position bar 73 to show all of the selected doors to be locked, the small intermittent pinion 111 has its teeth meshing with the teeth on the large intermittent gear 108, as best seen in FIG. 15, and the small intermittent pinion 113 has its smooth part engaging the smooth part of the intermittent gear 108.

When the master motor control switch 138 is turned over to contact 141 marked CLOSED, the circuit to the motor through limit switch 135 is closed, which energizes the motor to rotate in a direction to cause the doors to be moved from open to closed position. The drive shaft of the intermittent gearing is rotated to cause the large intermittent gear 108 to be rotated counterclockwise, as viewed in FIG. 15.

As the intermittent gear 108 is rotated counter-clockwise the intermittent pinion 111 is turned clockwise through approximately 165° to the position shown in FIG. 16, so that the crank pin 128 moves to its upper dead center position, the movement causing the locking bar 15 to be moved to the right as viewed in FIG. 1, to unlock the doors. Simultaneously, the lever assembly 79 has moved the lock position bar 73 to show that all of the selected doors are unlocked. The intermittent pinion 111 is held in this position while movement is being imparted to the intermittent pinion 113, it being noted that the pinion 113 has been held stationary while the pinion 111 was being rotated. After the pinion 111 assumes the position shown in FIG. 16, the teeth on the intermittent gear 108 engage the teeth on the intermittent pinion 113 and impart movement to it in a clockwise direction until it and the shaft 112 on which it is keyed has turned through one complete revolution and its smooth part engages the smooth part of the intermittent gear 108. As the shaft 112 rotates, the sprocket 114 keyed thereon drives, by means of sprocket chain 121, gear unit 124 which drives the door travel bar 14 to the left in door closed direction and, simultaneously, as shaft 112 rotates, the sprocket 125 keyed thereon drives, by means of sprocket chain 126, the sprocket 69 of the indicating mechanism, thus causing the rack 51 to rotate the door position indicators to show the doors to be closing.

In FIG. 16, only half of the door operating movement has been imparted through the intermittent pinion 113 and the connected sprockets and chain. After a complete revolution is imparted to this pinion 113 the intermittent gear 108 completes its revolution and again assumes the position shown in FIG. 15, so that the intermittent pinion 111 is again turned throughout approximately 165° to impart locking movement to the locking bar 15 through the crank pin 128 and move it to the left as viewed in FIG. 1, to lock all of the selected doors in their locked position. At the same time, the lever assembly has moved the lock position bar 73 to show all the doors to be locked. Also, the cam member 133 has been rotated with the shaft 110 to bring the cam into engagement with the actuator 137 of the limit switch 135 and move it upward to open the switch and stop the motor. In that position, one complete cycle of operation has taken place. That is to say, the doors (or selected doors) have been unlocked, closed, and locked closed, and the motor stopped after the doors have been locked closed and, simultaneously, the mechanically operated indicating mechanism has been actuated to show the locked or unlocked condition and the closed or open position of the doors. The intermittent gear 108 and the small intermittent gear pinions 111 and 113 are in position when the motor is energized, to cause the large intermittent gear 108 to be rotated in a clockwise direction to cause the selected doors to be unlocked, moved to open position, locked in open position, and the motor stopped.

In the event of power failure in the prison or when for any reason the electric motor cannot be operated to drive the intermittent gear, the crank 146 can be turned to disengage the clutch mechanism (the position shown in FIG. 1), then lifted out of engagement with the hexagonal nut on the eccentric and mounted on the hexagonal nut on the main drive shaft of the intermittent gearing, so that the intermittent gearing can be operated manually.

From the foregoing it will be apparent that there has been provided novel and improved mechanically operated indicating mechanism for visually indicating at all times the locked or unlocked condition in transit position and the closed or open position of all of the doors in a keyless locking and operating system for operating a plurality of cell doors in a fully selective manner, employing intermittent gearing which may be electrically or manually operated to impart sequential movements to the operation of the locks and cell doors.

Obviously, the invention is not restricted to the particular embodiment thereof herein shown and described.

What is claimed is:

1. For use in fully selective keyless locking and operating jail installations of the class wherein a plurality of sliding cell doors are operated by a master propelling bar and a master locking bar sequentially operated by a master actuating mechanism and selector mechanism for each door, including selector levers for actuating the selector mechanism for connecting and disconnecting the door and its locking mechanism to the master propelling and locking bars; the combination with said master actuating mechanism and said selector levers, of means for visually and mechanically indicating at all times which doors are locked closed and which doors are locked open while connected to the master propelling and locking bars, which doors are locked closed and which doors are locked open while disconnected from the master propelling and locking bars, and which doors are in transit and visually indicate the position of the doors while in transit between the fully closed and fully open positions, including a horizontally slidable bar carrying indicia indicating the locked and unlocked condition for each cell door; means including a pivoted lever connected to be actuated by the operation of said master actuating mechanism to move said master locking bar to lock and unlock the cell doors for actuating said horizontally slidable bar; a plurality of door position indicators, one for each cell door, mounted for rotation about a vertical axis; a rack slidably mounted for horizontal reciprocation and positioned to engage and rotate said door position indicators; means including a pivoted lever connected to be actuated by the operation of said master actuation mechanism to move said master propelling bar to open and close the cell doors for actuating said slidable rack, thereby rotating said door position indicators to indicate the open or closed condition of the cell doors; and means pivotally and slidably connecting each of said door position indicators to one of said selector levers, whereby whenever the selector lever is moved to actuate the selector mechanism to select "off" the door associated therewith, the door position indicator will be disengaged from rotation by said rack.

2. Apparatus as set forth in claim 1, wherein said master actuating mechanism and said visual indicating means are mounted in a control cabinet behind a control panel provided with a plurality of pairs of vertically spaced sight openings, one pair for each cell door; wherein said visual indicating means are so positioned that one of said door position indicators and indicia carried by a portion of said lock condition indicator bar will be visible through the sight openings of the pair associated therewith; and wherein said selector levers project through said control panel to be operated by an operator to select "off" any desired cell doors.

3. In a fully selective keyless locking and operating system of the class employing sequentially operated master propelling and master locking bars for operating a plurality of sliding cell doors each provided with a selector mechanism operated by a selector lever to connect and disconnect the door and its locking mechanism from the master propelling and locking bars, indicating mechanism for visually indicating at all times the open and closed position and the locked and unlocked condition of each cell door, said indicating mechanism comprising a horizontally slidable locked condition indicating bar carrying indicia indicating the locked and unlocked condition of each cell door; means including pivoted levers actuated by the operation of moving said master locking bar for actuating said locked condition indicating bar; a plurality of door position indicators, one for each cell door; a reciprocably mounted rack positioned to engage and rotate said door position indicators; means including pivoted levers actuated by the operation of moving said master propelling bar for actuating said rack; and means pivotally connecting each of said door position indicators to one of said selector levers so that when the selector lever is moved to actuate the selector mechanism to select "off" the door connected thereto, the door position indicator will be disengaged from rotation by said rack, the construction and arrangement being such that the locked or unlocked condition and the position of each cell door as indicated by the locked condition indicator bar and the door position indicators conform at all times to the actual locked or unlocked condition and position of the cell door.

4. Apparatus for visually indicating at all times the open and closed position and the locked or unlocked condition of each cell door in a fully selective keyless locking and operating system of the class wherein sequentially operated master propelling and master locking bars operate a plurality of sliding cell doors, each provided with selector mechanism including a selector lever to effect selective engagement of the door to the master bars, comprising a horizontally slidable locked condition indicating bar carrying indicia indicating the locked and unlocked condition of each cell door; actuating means including levers for moving said locked condition indicator bar in one direction when said master locking bar is moved to lock the cell doors and in the opposite direction when the master locking bar is moved to unlock the cell doors; a plurality of door position indicators, one for each cell door, mounted for rotation about vertical axes; a rack slidably mounted for horizontal reciprocation and positioned to engage and rotate said door position indicators; actuating means including levers for moving said rack in one direction when said master propelling bar is moved to close the cell door and in the opposite direction when the master propelling bar is moved to open the cell doors; and means pivotally and slidably connecting each of said door position indicators to one of said selector levers so that when the selector lever is moved to actuate the selector mechanism to select "off" the door connected thereto, the door position indicator will be disengaged from rotation by said rack; the construction and arrangement being such that the locked or unlocked condition and the position of each cell door as indicated by the locked condition bar and the door position indicator conform at all times to the actual locked or unlocked condition and position of the door.

5. Apparatus as set forth in claim 4, including a supporting and guide frame on which said locked condition indicator bar and said door position indicators are mounted, said supporting and guide frame including vertically spaced horizontally extending upper and lower guide bars and wherein each of said door position indicators includes a shaft having its upper and lower end portions slidably and rotatably journaled in said upper and lower guide bars and carrying an elongated key on its lower end portion; a cylindrical member provided with a keyway slidably mounted on said shaft with said key received in said keyway, said cylindrical member carrying circumferentially spaced indicia denoting the "closed" or "open" positions of the door associated therewith; and a gear member provided with a keyway slidably mounted on said shaft above said cylindrical member and in engagement with said rack.

6. Apparatus as set forth in claim 5, wherein said lower guide bar is provided with a row of laterally spaced circular openings forming the lower bearings for said shafts and with each circular opening provided with a circumferentially spaced pair of keyways opening thereinto, said keyways being so positioned that the key on the shaft will be in vertical alignment with one of the keyways when the cylindrical member is in either the position indicating the closed and open position of the cell door associated therewith and wherein a connector pivotally and slidably connects each shaft to one of said selector levers; the construction and arrangement being such that whenever a selector lever is swung downward to select "off" the cell door associated therewith, the shaft will be moved downward to unlock the gear from the shaft and to lock the shaft and cylindrical member keyed thereon against rotation by said gear.

7. Apparatus as set forth in claim 6, wherein said locked condition indicator bar slidably engages the upper side of said upper guide bar and is provided with a row of laterally separated circular holes in each of which is received one of said shafts and with each circular hole having a laterally extending slot opening thereinto and wherein each of said shafts has a pair of vertically spaced circumferential grooves formed thereon with each groove having a shaft clearance less than the width of the slots in said locked condition indicator bar, the construction and arrangement being such that the upper grooves in said shaft will be in position to be received in said slots when the cell doors associated therewith are selected "OFF" and the lower grooves in said shafts will be in position to be received in said slots when the cell doors associated therewith are selected "ON," the construction and arrangement being such that the locked condition indicator bar can be reciprocated when cell doors are selected "on" and "off."

8. Apparatus as set forth in claim 7, wherein the width of the laterally extending slots opening into the circular holes formed in the locked condition indicator bar are slightly larger than the diameter of said shafts at said vertically spaced grooves, the construction and arrangement being such that after the locked condition indicator bar has been moved to cause said shafts to enter said slots, said shafts will be locked against translatory movement by the edges of the grooves, thereby preventing change in door selection after the door unlocking cycle of the door operation is started and indexing out of sequence of operation.

9. Apparatus as set forth in claim 8, wherein the master locking and master propelling bars are sequentially operated by a master actuating mechanism and wherein said master actuating mechanism and said visual indicating means are mounted in a control cabinet behind a control panel provided with a plurality of pairs of vertically spaced sight openings, one pair for each cell door; wherein said visual indicating means are so positioned that one of said door position indicators and a portion of said lock condition indicator bar will be visible through the sight openings of the pair associated therewith; and wherein said selector levers project through said control panel to be operated by an operator to select "off" any desired cell doors.

10. Apparatus as set forth in claim 9, wherein each of the shafts of said door position indicators carries at its upper end a depending tag carrying the indicia LOCKED OFF, said tag being so positioned that when the door associated with the door position indicator is selected "off" said tag will be lowered to appear in the upper of the sight windows associated with the door and blank off the portion of the locked condition indicator bar normally visible therethrough.

11. Apparatus as set forth in claim 10, wherein each of the cylindrical door position indicator members has a plastic cylindrical indicia drum mounted thereon, said drum carrying a pair of laterally spaced indicia, one indicating the closed position and the other the open position of the cell door associated therewith, with space between the two indicia divided by a diagonal line into two triangular sections of contrasting colors, the construction and arrangement being such that as the cylindrical door position indicator is rotated to conform to the position of the door associated therewith, the contrasting colored sections will visually indicate the position of the door while in transit between the fully closed and open positions.

12. Apparatus as set forth in claim 4, wherein said levers for moving said locked condition indicator bar comprises an upper lever and a lower lever pivotally mounted for rotation about a fixed pin and having adjacent end portions resiliently and separably connected together and wherein said levers for moving said rack comprise an upper lever and a lower lever pivotally mounted for rotation on said fixed pin and having adjacent end portions resiliently and separably connected together, the construction and arrangement being such that when the locked condition indicator and the rack have reached the end of their movements in either direction continued pressure applied to the lever sections will merely cause the lever sections to be separated without damage to the bar and rack.

References Cited in the file of this patent

UNITED STATES PATENTS

| | | |
|---|---|---|
| 635,602 | Schoenfeld | Oct. 24, 1899 |
| 1,781,297 | Perlman | Nov. 11, 1930 |
| 1,828,721 | Perlman | Oct. 20, 1931 |
| 2,961,076 | White et al. | Nov. 27, 1960 |